United States Patent [19]

Jungwirth

[11] Patent Number: 4,688,717

[45] Date of Patent: Aug. 25, 1987

[54] REVERSE CYCLE HEATING SYSTEM FOR A BUILDING

[75] Inventor: Curtis A. Jungwirth, Rte. 5, Box 677, Newberg, Oreg. 97132

[73] Assignees: Curtis A. Jungwirth; James Jungwirth, both of Newberg, Oreg.

[21] Appl. No.: 672,750

[22] Filed: Nov. 19, 1984

[51] Int. Cl.$^4$ ............................................. G05D 23/00
[52] U.S. Cl. ..................................... 237/2 B; 62/260; 165/45
[58] Field of Search ................... 62/260, 324.1, 238.6; 237/2 B; 165/45

[56] References Cited

U.S. PATENT DOCUMENTS

| | | | |
|---|---|---|---|
| 2,693,939 | 11/1954 | Marchant et al. | 237/2 B |
| 4,433,720 | 2/1984 | Lowstuter | 62/260 X |
| 4,466,256 | 8/1984 | MacCracken | 62/260 |
| 4,483,318 | 11/1984 | Margen | 62/260 |

*Primary Examiner*—Henry A. Bennet
*Attorney, Agent, or Firm*—Klarquist, Sparkman, Campbell, Leigh & Whinston

[57] ABSTRACT

A heating system having buried, outwardly directed loops through which freon is routed for partaking of ground heat. The buried loops are inclined downwardly from an expansion valve and distributor with the loops each discharging into a central collector from where the freon vapor is directed to a liquid trap and thence a compressor. A medium-to-air heat exchanger is located in a cold air duct. A receiver tank stores liquid freon and supplies in a constant manner to the expansion valve.

2 Claims, 2 Drawing Figures

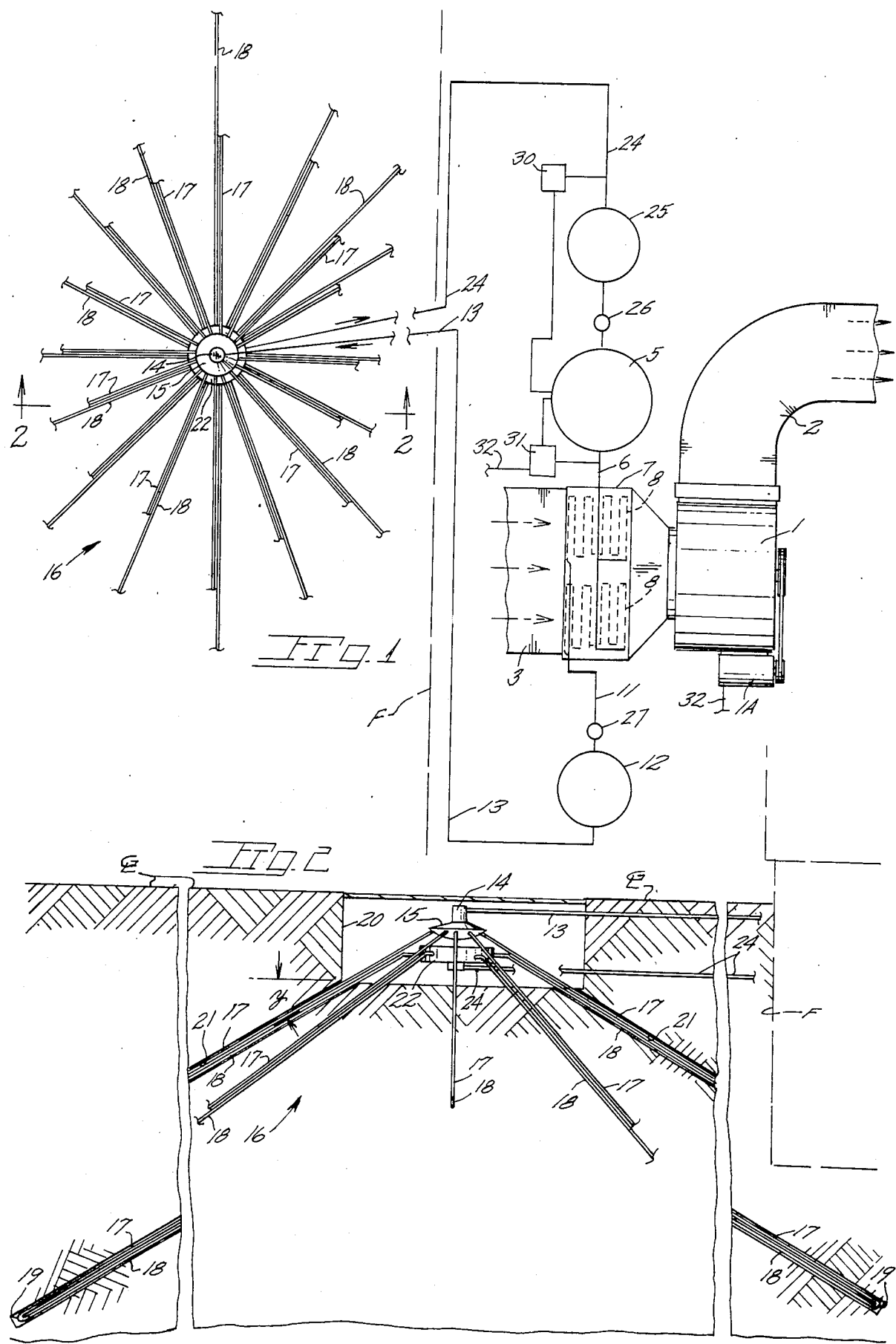

REVERSE CYCLE HEATING SYSTEM FOR A BUILDING

BACKGROUND OF THE INVENTION

The present invention pertains generally to heating systems for homes, buildings, etc., utilizing a reverse cycle refrigeration process with earthen material being a heat source.

In the prior art a number of heating systems have been proposed which utilize a buried ground coil through which a medium passes for heating by the earthen material. Such systems utilize, briefly, a reverse refrigeration process wherein a circulated medium is heated by passage through a buried coil and subsequently pressurized prior to flow through a liquid-to-air heat exchanger. The medium, cooled by passage through the heat exchanger, is directed back in an altered state through a buried ground coil. An expansion valve serves to meter a partially vaporized medium flow to the ground coil.

Obvious advantages to such a system if certain drawbacks were overcome include the avoidance of fossil fuel cost and their environmental impact.

While several attempts have been made over several years to embody such heating systems in a practical system for single family or larger dwellings, none of the proposed systems have found wide acceptance. One significant problem encountered by the prior art systems was the freezing of the earthen material by the system ground coil. Such freezing rendered the system inoperable and in some cases imparted stresses to adjacent building foundations damaging same. Heretofore it has been proposed that a coil be buried in serpentine configuration to adequately subject the medium to ground heat. The burial of lenghty conduit runs constituted a problem partuclarly when the ground area within which the conduit was buried was of restricted size resulting from various subterranean obstructions and/or real property size limitations.

The use of heat pumps in home and building heating systems incurs periodic pump servicing or replacement at considerable expense to the user. Heat pumps, as currently known, are subjected to severe pressures and temperatures which adversely affect their life.

SUMMARY OF THE PRESENT INVENTION

The present invention is embodied within a reverse cycle building and water heating system which utilizes a multitude of buried refrigeration loops for optimum heating by earther material.

The present heating system includes a medium-to-air heat exchanger in a forced air conduit. The medium, upon discharge from the heat exhanger, is directed toward buried distribution means whereat the fluid flow is apportioned into several looped conduits. A collector is in communication with the discharge or suction end of each looped conduit and directs the ground heated flow toward a compressor which, in turn, serves the aforementioned heat exchanger.

The present invention is directed toward multitude of looped conduits which extend away from a distributor with each conduit loop being inclined to the ground surface. Each looped conduit occupies a bore in the earthen material and into which the looped conduit is installed during system assembly. Such placement of the looped conduits reduces the ground area requirement for the present system. A preferred manner of forming the ground defined bores has been by drilling the bores radially outward from a central excavation site with the bores lying in diverging vertical planes. An excavation of modest size receives the distribution means and the collector for the conduit ground loops.

Important objectives of the resent system include the provision of a heating system utilizing more or less constant ground heat and having both an extremely low maintenance requirement and a coefficient of performance considerably higher than other heating systems in use; the provision of a heating system which takes heat from the ground adjacent or below a building without risk of freezing the ground to thereby avoid risk of damage to buried structures such as building foundations, pipes, basement walls, etc.,; the provision of a heating system which utilizes looped conduits with uniform medium flow therethrough; the provision of a heating system having inclined ground loops radiating from distributor and collector means and which avoid the collection of condensate at the lower end of each loop; the provision of a heating system with buried ground loops which is highly compatible with already installed forced air systems to enable use of the present system at a low installation cost.

BRIEF DESCRIPTION OF THE DRAWING

In the accompanying drawing:
FIG. 1 is a schematic plan view of the present system;
FIG. 2 is a vertical sectional view taken approximately along line 2—2 of FIG. 1.

DETAILED DESCRIPTION OF THE PREFERRED EMBODIMENTS

With continuing attention to the drawing wherein applied reference numerals indicate parts similarly hereinafter identified, the reference numeral 1 indicates a centrifugal fan driven by a motor 1A serving a hot air conduit 2 in a building heating system with outlets not shown. A return or cool air flow conduit is at 3. Conduit air outlets and inlets are not shown. In existing dwellings or buildings the present system is very often compatible with the existing forced air ducting and fan.

The present heating system includes a compressor indicated at 5 which pressurizes the medium, preferably freon vapor, earlier heated by flow through later described buried conduit loops. A compressor outlet 6 serves a counter flow condenser 7 serving as a medium-to-air heat exchanger and located to heat cold air in return duct 3. Tubing at 8 in the condenser is shown schematically includes multiple passes. An outlet 11 delivers the liquid freon to a receiving tank 12 which maintains a constant supply of liquid refrigerant to an outlet line 13.

Line 13 carries the freon liquid to a thermostatic expansion valve 14 preferably concealed below ground level in an excavation 20. The expansion valve 14 controls passage of the medium to an associated distributor 15 of a buried loop system indicated generally at 16. The distributor directs fluid and vapor into a multitude of diverging conduit loops each comprised of an outwardly extending tube run or member 17 and a return tube run or member 18 with the outer extremities of the tubes being in communication at 19. With continuous reference to FIG. 2, it will be seen that the conduits loops extend outwardly and downwardly from excavation 20 in which expansion valve 14, the distributor 15 and a collector 22 are conveniently housed.

Ground defined bores at 21 are formed as by drilling off of the horizontal at an angel y which angle may vary from system to system to avoid obstructions such as a foundation 7 with optimum inclination being approximately 25 degrees to 30 degrees from a ground surface. The inclination may even vary somewhat between ground bores in a system. Suitable bores are of a diameter of about two and one-half inches to conveniently accept a conduit loop inserted therein. Accordingly, the conduit loop comprising runs 17-18 are in contact or close proximity with the earthen material. The return conduit run 18 typically terminates at collector 22. Collector 22 is symmetrically disposed with respect to the conduit loops and in communication with a return or suction line 24 which terminates at a suction line accumulator 25 which traps any liquid to prevent same from entering the compressor. Service valves at 26 and 27 permit isolation of certain components of the system. A compressor motor low pressure limit switch 30 prevents motor operation when pressure in suction line 24 falls below pressure requirements. A fan control switch 31 is in circuit with fan motor 1A via a lead 32 and with a thermostat.

In one practical embodiment of the present system having a five ton rating the total conduit loop tubing of tube members 17-18 is approximately 1800 feet. The tubing may be one-half inch o.d., copper tubing. Accumulator 24 may be a product of Refrigeration Research, Inc. identified as Model 3700; compressor 5 a product of Tecumseth identified as Model AG 4543; receiver tank 12 manufactured by the Standard Refrigeration Company and identified as Model L-623; distributor 15 a component manufactured by the Sporlan Valve Company to order with sixteen nozzle orifices and similar to their Type 1113 while expansion valve 14, being also a product of the Sporlan Company, and identified as Model SVE 5C. Expansion valve 14 of the present system is equipped with an external equalizer line and with a temperature bulb both well known features of conventional expansion valves. The medium used is freon 22.

While I have shown but one embodiment of the invention, it will be apparent to those skilled in the art that the invention may be embodied still otherwise without departing from the spirit and scope of the invention.

Having thus described the invention, what is desired to be secured in Letters Patent is:

1. In a reverse cycle heating system for a building structure including a compressor acting on a ground heated vaporizable medium, a medium-to-air heat exchanger, means moving an air flow past said heat exchanger, and an expansion valve receiving the medium from said heat exchanger, the improvement comprising:

a distributor having a multitude of outlets, a collector into which the medium subsequently flows, and a plurality of conduit loops for buried placement, each of said loops being in receiving and discharge communication respectively with the distributor and the collector, said conduit loops extending downwardly in an inclined manner from said distributor and said collector, each of said conduit loops being in a diverging relationship with adjacent conduit loops, each of said conduit loops comprising an inwardly and an outwardly directed parallel tube member adapted for endwise installation within a ground bore, each of said conduit loops being inclined downwardly from a horizontal ground surface at approximately twenty-five to thirty degrees.

2. The heating system of claim 1, wherein the conduit loops are in radially disposed vertical planes.

* * * * *